United States Patent [19]

Proctor

[11] 4,182,174
[45] Jan. 8, 1980

[54] HINGE JOINTS

[75] Inventor: Ronald K. Proctor, Maidstone, England

[73] Assignee: Elliott Brothers (London) Limited, Chelmsford, United Kingdom

[21] Appl. No.: 924,689

[22] Filed: Jul. 14, 1978

[30] Foreign Application Priority Data

Jul. 25, 1977 [GB] United Kingdom ............ 31108/77

[51] Int. Cl.² .................... G01F 1/46; G01F 15/18
[52] U.S. Cl. .................................................. 73/212
[58] Field of Search ................. 73/179, 198, 212, 505

[56] References Cited

U.S. PATENT DOCUMENTS

| 3,474,669 | 10/1969 | Carter et al. | 73/212 X |
| 3,699,811 | 10/1972 | Maiden et al. | 73/212 X |
| 3,750,470 | 8/1973 | Partzsch | 73/212 |
| 4,000,647 | 1/1977 | Tauchmann | 73/212 X |

FOREIGN PATENT DOCUMENTS 1181669  2/1970  United Kingdom .
1317679  5/1973  United Kingdom .

Primary Examiner—Herbert Goldstein
Attorney, Agent, or Firm—Kirschstein, Kirschstein, Ottinger & Cobrin

[57] ABSTRACT

A head for sensing fluid flow pressure of the kind comprising a swivelling pitot tube wherein the pitot tube is mounted on a hinge joint through which fluid pressure at the pitot tube and the angular position of the pitot tube are transmitted without the use of dynamic seals. The fluid pressure is transmitted via a passageway extending by way of the hollow pivot pin on one member of the hinge joint to which the pitot tube is fixed, a hollow shaft in the other hinge joint member and a flexible tubular connection between the pivot pin and shaft, the shaft being coupled to the pivot pin so as to rotate therewith and reduce relative rotation between the ends of the flexible connection. The angular position of the shaft indicates the angular position of the pitot tube. The head finds especial application in helicopter airspeed measuring apparatus.

10 Claims, 4 Drawing Figures

HINGE JOINTS

This invention relates to heads for sensing fluid flow pressure.

The invention relates particularly to heads for sensing fluid flow pressure of the kind comprising a swivelling pitot tube adapted to be mounted in a fluid flow and to align itself with the direction of fluid flow.

One application of such a head is in apparatus for measuring helicopter airspeed, as described in United Kingdom patent specification No. 1,181,669. For this application the pitot tube is adapted to be mounted beneath the helicopter rotor in the downwash of the rotor. To enable airspeed to be computed the fluid pressure at the pitot tube and the angular position of the pitot tube are required to be transmitted to suitable measuring devices. For satisfactory operation the frictional resistance to swivelling of the pitot tube is required to be as low as possible so that the pitot tube will accurately align with the direction of air flow, even at low airspeeds.

It is an object of the present invention to provide a swivelling pitot tube fluid flow pressure sensing head wherein these requirements are simply and economically met.

According to the present invention, in a head for sensing fluid flow pressure comprising a swivelling pitot tube adapted to be mounted in the fluid flow and to align itself with the direction of fluid flow, the pitot tube is mounted on a hinge joint comprising: a hollow first member into which a hollow pivot pin extends from a second member of the hinge joint to which the pitot tube is fixed so that the first member and the pitot tube are capable of relative angular movement about the pitot pin axis; a hollow shaft which extends lengthwise along the interior of a tubular projection of the first member; a coupling between the pivot pin and the shaft which converts angular movement of the pitot tube, with respect to the first member, about the pivot pin axis to rotary movement of the shaft relative to the tubular projection; and a flexible tubular connection between the pivot pin and the shaft to provide a passageway through the joint for the transmission of fluid pressure from the pitot tube.

Preferably the coupling between the pivot pin and the shaft has a 1:1 drive ratio. Said coupling suitably comprises a bevel gearing arrangement.

In one particular embodiment of the invention said tubular projection is rotatably mounted within a further outer tubular member so that angular movement of the second member, and hence the pitot tube, about the axis of said outer tubular member produces corresponding rotary movement of said tubular projection relative to the outer tubular member.

The outer tubular member is conveniently used as a support member for mounting the head in the fluid flow.

In a head according to the invention a second passageway for the transmission of fluid pressure through the hinge joint may be provided by way of the interior of said first member of the hinge joint and the annular space between said shaft and said tubular projection.

The second passageway may extend from the pitot tube to the interior of the first member by way of the interior of a second hollow pivot pin which extends from said second member into said first member coaxially with said first-mentioned pivot pin.

The second passageway may conveniently be used to transmit static fluid pressure from the pitot tube.

A head according to the invention finds especial application in apparatus for measuring helicopter airspeed.

In a pressure sensing head according to the invention the transmission of pitot tube pressure through the hinge joint via a flexible tubular connection between members which rotate together avoids the need for large dynamic shaft seals, O-rings or the like, thereby enabling lower friction levels and better measurement accuracy to be obtained than are possible with comparable prior art heads. Furthermore, greater reliability can be achieved since the flexible tubular connection is not subject to wear and leakage therepast which are difficulties commonly encountered with large dynamic seals. Furthermore, the use of those elements which transmit fluid pressure to transmit also an indication of the angular position of the pitot tube leads to an elegant simplicity in the construction of the head.

One pressure sensing head in accordance with the invention will now be described, by way of example, with reference to the accompanying drawings in which:

FIG. 3 is a sectional diagram of the hinge joint; and

The head forms part of apparatus for measuring airspeed of a helicopter.

Figure 2:
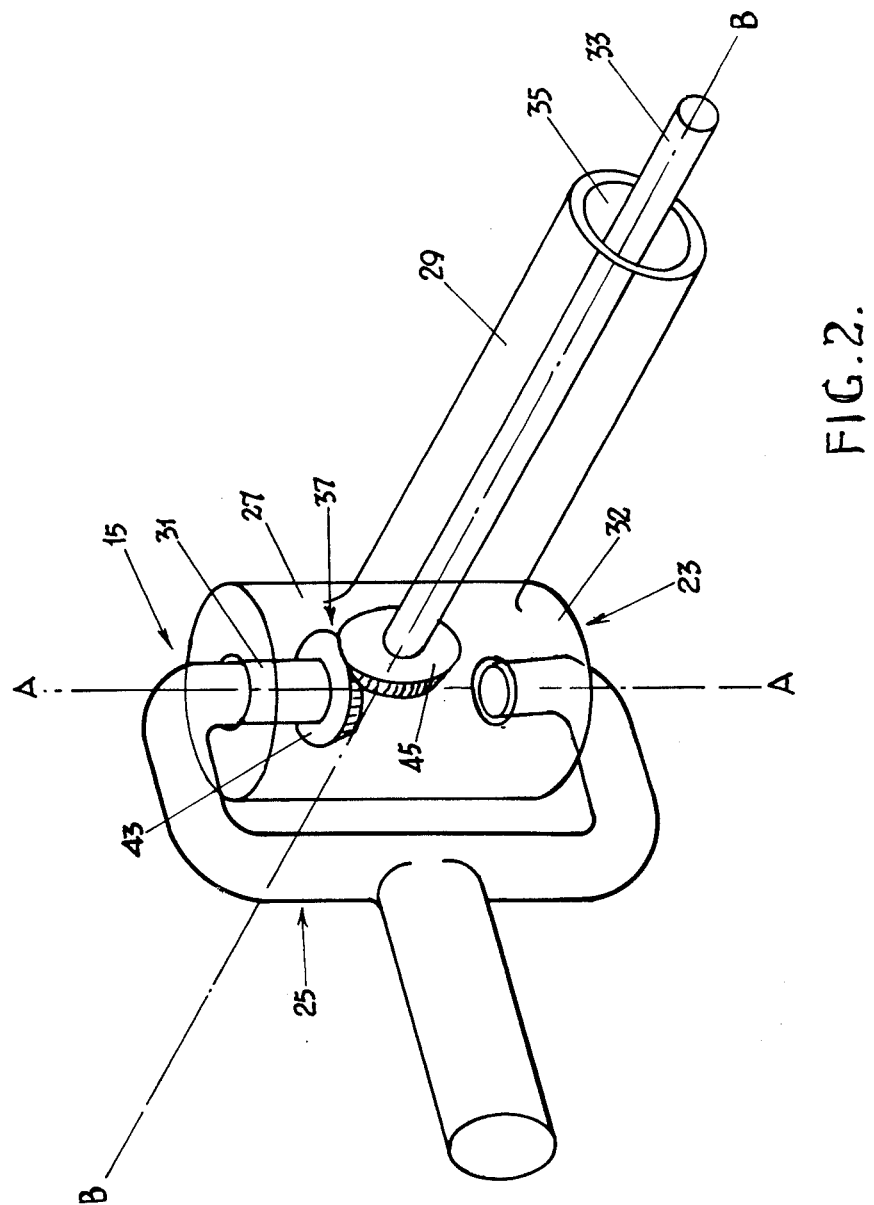
FIG. 2 is a perspective diagram of a hinge joint employed in the head.
Figure 4:
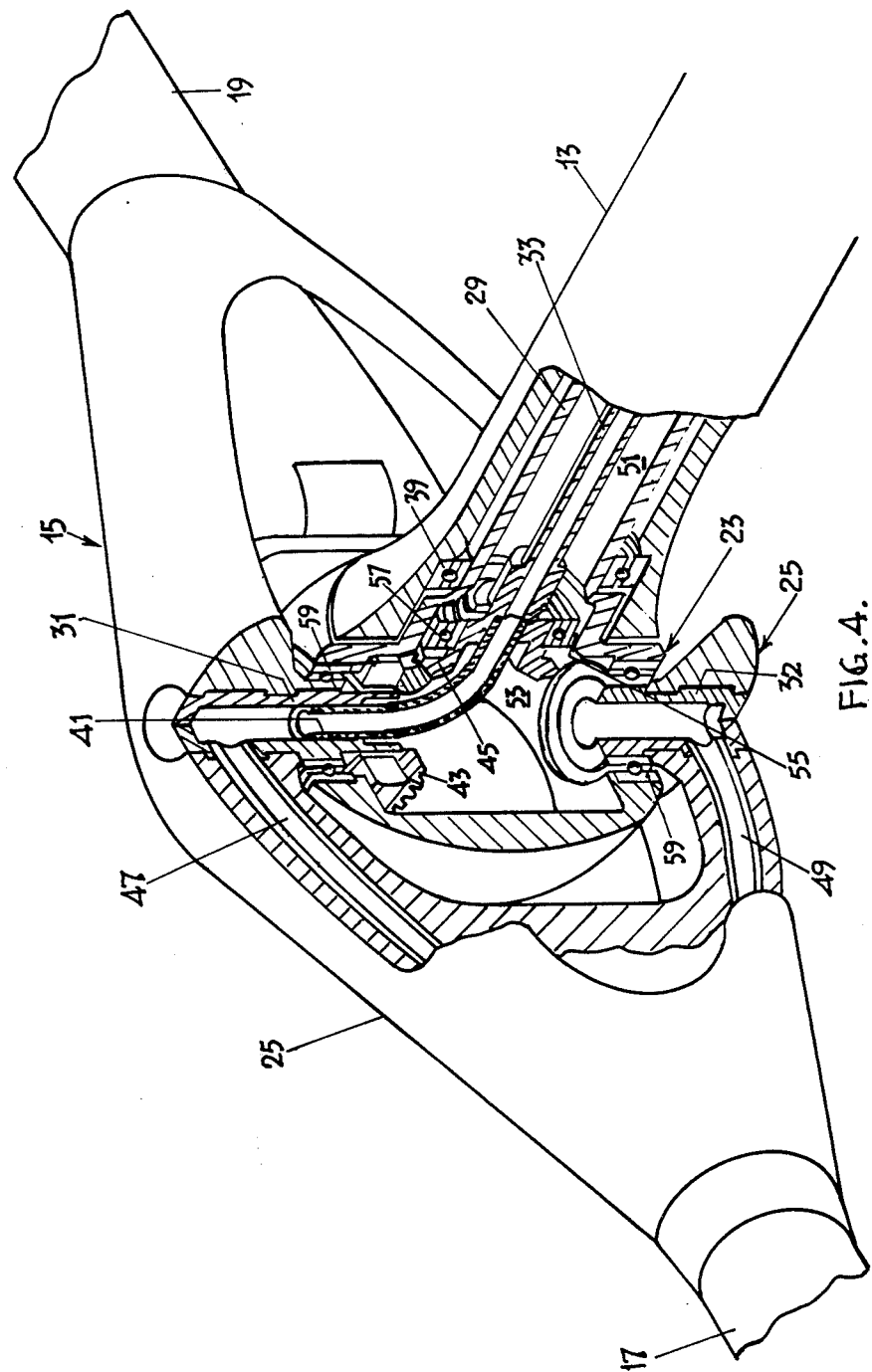
FIG. 4 is an enlarged perspective view of part of the head showing the hinge joint in section.

Referring to the drawings, the head comprises an outer tubular support member 13 (not shown in FIG. 2) by which the head is attached to the helicopter beneath the helicopter rotor in the downwash region thereof. A pressure sensing or pitot tube 17 is mounted on the support member 13 by way of a hinge joint 15. The head further includes a tail part 19 which carries weathercock arrangement 21 on which the rotor downwash acts to cause the pitot tube 17 to align with the direction of airflow in the downwash.

The joint 15 comprises first and second hinged members 23 and 25. The member 23 has a hollow body part 27 and a tubular part 29 which projects outwardly from the body part 27, its interior 35 communicating with the interior of the part 27. The pitot tube 17 is mounted on the member 25.

The two hinged members 23 and 25, are coupled together by hollow pivot pins 31 and 32 which are parts of the member 25 and extend axially into opposite ends of the body part 27 of member 23 and are supported in bearings 59. The members 23 and 25, and hence the pitot tube 17 and member 23, are thus capable of relative angular movement about the pivot pin axis A—A.

A tubular shaft 33 supported in bearings 57 extends coaxially lengthwise along the interior 35 of the tubular part 29. A coupling 37 between the shaft 33 and the pivot pin 31 comprising bevel gears 43, 45 and having a 1:1 drive ratio converts angular movement of the member 25, and hence of the pitot tube 17, about the axis A—A, to equal rotary motion of the shaft 33 relative to the tubular part 29.

The tubular part 29 is supported, by bearings 39, coaxially within the outer tubular support member 13 so that the members 23 and 25, and hence pitot tube 17, are free to rotate together about the axis B—B of the member 13.

It will be appreciated that rotation of pitot tube 17 and members 23 and 25 about the axis B-B does not give rise to any relative angular movement between shaft 33 and the tubular part 29.

Figure 1:
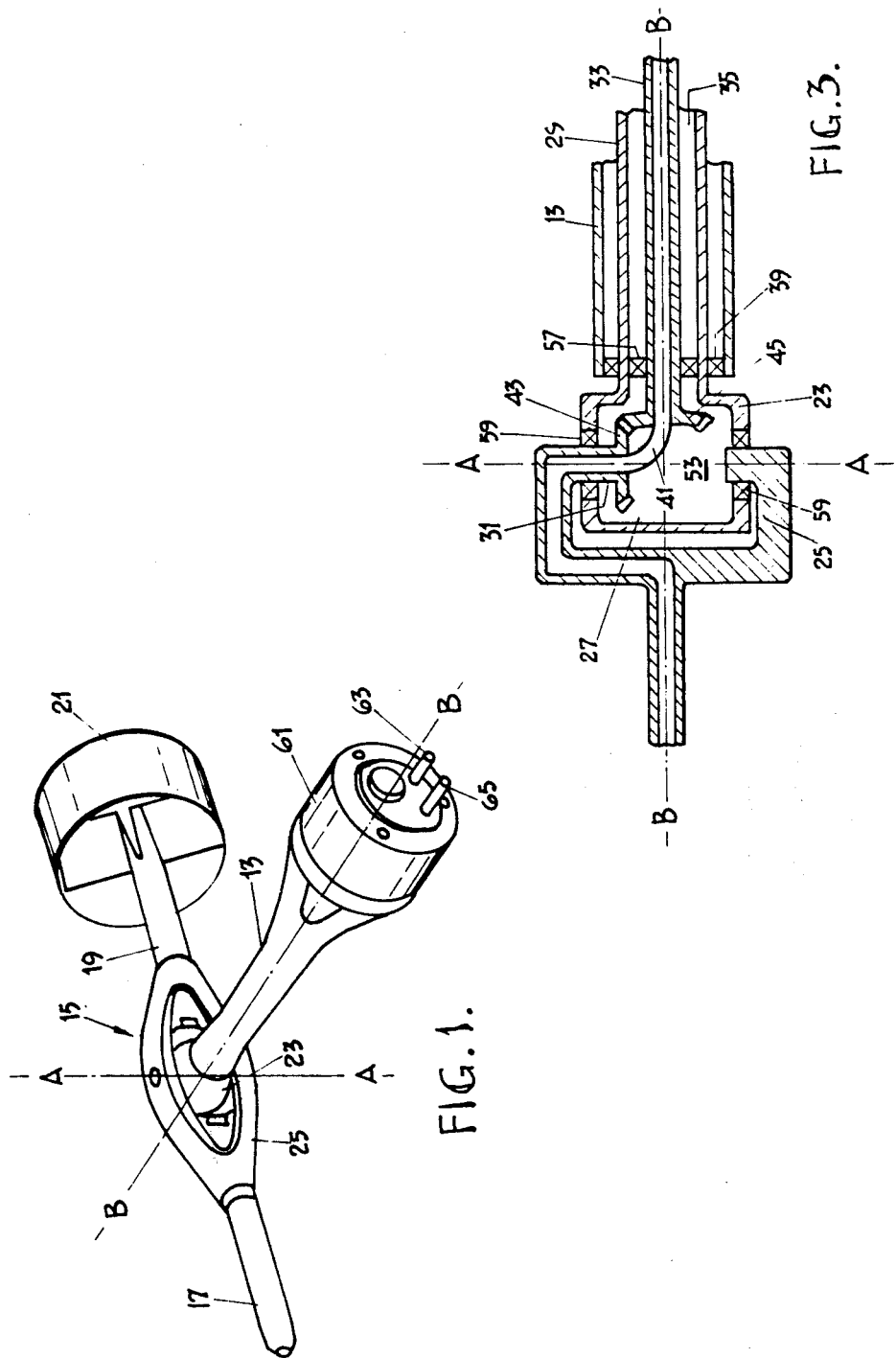
FIG. 1 is a perspective view of the pressure sensing head.

Relative rotary movement between shaft 33 and tubular part 29 and relative rotary movement between the parts 29 and 13 are detected by synchros or other angular displacement measuring devices (not shown). Electrical signals are thus obtained which are representative of the position of member 25 and hence the pitot tube 17, with respect to axes A—A and B—B, which signals are utilised in computing helicopter airspeed in known manner. These measuring devices are suitably housed in a cylindrical compartment 61 secured to the outer support member 13 (see FIG. 1).

The tube 17 senses both pitot (total impact) and static air pressure. To this end the tube 17 has, as is conventional, a central tube (not visible) for sensing pitot pressure and an outer tube for sensing static pressure which the central tube defines an annular passage communicating through the side of the outer tube with the atmosphere by apertures designed and positioned so as to be free of any contamination from pressure component arising from relative airflow past the head.

The hinge joint serves in the transmission of pitot and static pressures from the pitot tube 17 to pressure transducers (not shown), the transducers producing electrical signals representative of pitot and static pressure for use in computation of airspeed.

To this end, the member 25 of the hinge joint is provided with interior passages 47 and 49 which communicate respectively with the central pitot pressure sensing tube and the surrounding annular static pressure sensing passage of the pitot tube 17.

The passage 47 communicates also with the hollow interior of the pivot pin 31 which in turn is connected to the hollow interior of the tubular shaft 33 by way of a flexible tube 41 made, for example, of rubber. A pressure transducer (not shown) for pitot pressure is coupled to the interior of the shaft 33 via a tube 63 extending through the wall of the cylindrical compartment 61 fixed to the end of the support member 13.

The passage 49 communicates also with the annular passage 51 between the shaft 33 and the surrounding tubular part 29 by way of the hollow pivot pin 32, the hollow interior 53 of part 23 of the hinge joint and a passage 55 past the bearing 57 by which the shaft 33 is supported within tubular part 29. A pressure transducer (not shown) for static pressure is coupled to the passage between shaft 33 and part 29 via a tube 65 extending through the wall of the compartment 61.

It will be appreciated that since the drive ratio between pivot pin 31 and shaft 33 is 1:1 there is no relative rotational movement between the ends of tube 41 and the parts 31 and 33. A good air-tight seal is thus obtained. Moreover, wear on tube 41 and frictional resistance in the hinge joint to movement of the pitot tube 17 about axes A—A and B—B is minimal.

It will be understood that within the housing 63 there is a dynamic seal arrangement (not shown) by which the tubes 63 and 65 are sealed to the shaft 33 and the tubular part 29 respectively. However these seals can be made of small area so as to give rise to very little frictional resistance to movement of the pitot tube. Much greater frictional resistance is introduced if dynamic seals are incorporated in the hinge joint per se, as is done in prior art arrangements.

It will be appreciated that while in the above described embodiment the pitot tube 17 senses pitot and static pressures, in other arrangements in accordance with the invention the pitot tube may be arranged to sense pitot pressure only and a single fluid pressure transmission passage through the hinge joint only may be provided.

I claim:

1. A head for sensing fluid flow pressure comprising a swivelling pitot tube adapted to be mounted in the fluid and to align itself with the direction of fluid flow wherein the pitot tube is mounted on a hinge joint comprising: a hollow first member into which a hollow pivot pin extends from a second member of the hinge joint to which the pitot tube is fixed so that the first member and the pitot tube are capable of relative angular movement about the pivot pin axis; a hollow shaft which extends lengthwise along the interior of a tubular projection of the first member; a coupling between the pivot pin and the shaft which converts angular movement of the pitot tube, with respect to the first member, about the pivot pin axis to rotary movement of the shaft relative to the tubular projection; and a flexible tubular connection between the pivot pin and the shaft to provide a passageway through the joint for the transmission of fluid pressure from the pitot tube.

2. A head according to claim 1 wherein the coupling between the pivot pin and the shaft has a 1:1 drive ratio.

3. A head according to claim 1 wherein said coupling comprises a bevel gearing arrangement.

4. A head according to claim 1 including means responsive to the relative positions of the shaft and tubular projection for indicating the angular position of the pitot tube about the pivot pin axis.

5. A head according to claim 1 wherein said tubular projection is rotatably mounted within a further outer tubular member so that angular movement of the second member, and hence the pitot tube, about the axis of said outer tubular member produces corresponding rotary movement of said tubular projection relative to the outer tubular member.

6. A head according to claim 5 including means responsive to the relative positions of the tubular projection and the outer tubular member for indicating the angular position of the pitot tube about the axis of said outer tubular member.

7. A head according to claim 1 wherein a second passageway for the transmission of fluid pressure through the hinge joint is provided by way of the interior of said first member of the hinge joint and the annular space between said shaft and said tubular projection.

8. A head according to claim 7 wherein said second passageway extends to the pitot tube from the interior of the first member by way of the interior of a second hollow pivot pin which extends from said second member into said first member coaxially with said first-mentioned pivot pin.

9. A head according to claim 8 wherein said second passageway is arranged to transmit static fluid pressure from the pitot tube.

10. A head according to claim 1 wherein a weathercock arrangement is provided to cause the pitot tube to align with the direction of fluid flow.

* * * * *